United States Patent
Fujibayashi et al.

[11] Patent Number: 5,815,399
[45] Date of Patent: Sep. 29, 1998

[54] MULTI-PATH SYNCHRONIZATION SYSTEM FOR CNC CONTROLLER

[75] Inventors: Kentaro Fujibayashi, Musashino; Yorikazu Fukui, Tokyo, both of Japan

[73] Assignee: Fanuc Ltd, Yamanashi, Japan

[21] Appl. No.: 549,934

[22] Filed: Oct. 30, 1995

[30] Foreign Application Priority Data

Dec. 7, 1994 [JP] Japan .................................. 6-303368

[51] Int. Cl.⁶ .............................................. G05B 19/4155
[52] U.S. Cl. .................. 364/474.11; 364/474.11; 364/474.22; 364/474.23; 364/474.28; 318/568.11; 318/568.13
[58] Field of Search ................. 364/474.01, 474.11, 364/474.22, 474.23, 136, 191, 921.2, 926.9, 131, 147, 244, 927.2, 931.4, 932.6, 134, 188, 230.4, 474.28; 318/568.11, 568.13, 568.2, 569, 570, 572; 395/95

[56] References Cited

U.S. PATENT DOCUMENTS

| | | |
|---|---|---|
| 3,668,653 | 6/1972 | Fair et al. ........................... 354/474.11 |
| 4,370,720 | 1/1983 | Hyatt .................................. 364/474.36 |
| 4,631,684 | 12/1986 | Akasofu et al. .................... 364/474.01 |
| 4,635,185 | 1/1987 | Kishi et al. ............................. 364/191 |
| 4,663,705 | 5/1987 | Kishi et al. ............................. 364/191 |
| 5,132,964 | 7/1992 | Esaki ...................................... 370/418 |
| 5,140,237 | 8/1992 | Sasaki et al. ....................... 318/568.11 |

*Primary Examiner*—Emanuel T. Voeltz
*Assistant Examiner*—Cuong H. Nguyen
*Attorney, Agent, or Firm*—Staas & Halsey

[57] ABSTRACT

A single control unit in a multi-path synchronization system for a CNC controller simultaneously controls a plurality of paths. A program storage unit stores NC programs corresponding to respective paths. Those NC programs contains synchronization command codes which specify conditions of multi-path synchronization. A decoding unit decodes the NC programs for respective paths. Axis control unit controls the axes of a machine containing the paths by executing the decoded NC programs a in parallel. While executing the NC programs, synchronization control unit interlocks the motion of each axis according to the synchronization conditions specified by the synchronization command codes written in the NC programs.

2 Claims, 5 Drawing Sheets

| | PATH (SY) | | | | | |
|---|---|---|---|---|---|---|
| P | 6 | 5 | 4 | 3 | 2 | 1 |
| 01 | X | X | X | X | X | O |
| 02 | X | X | X | X | O | X |
| 03 | X | X | X | X | O | O |
| 04 | X | X | X | O | X | X |
| 05 | X | X | X | O | X | O |
| 06 | X | X | X | O | O | X |
| 07 | X | X | X | O | O | O |
| 08 | X | X | O | X | X | X |
| 09 | X | X | O | X | X | O |
| 10 | X | X | O | X | O | X |
| 11 | X | X | O | X | O | O |
| 12 | X | X | O | O | X | X |
| 13 | X | X | O | O | X | O |
| 14 | X | X | O | O | O | X |
| 15 | X | X | O | O | O | O |
| 16 | X | O | X | X | X | X |
| 17 | X | O | X | X | X | O |
| 18 | X | O | X | X | O | X |
| 19 | X | O | X | O | O | O |
| 20 | X | O | X | X | X | X |

FIG.3 (A)

| | PATH (SY) | | | | | |
|---|---|---|---|---|---|---|
| P | 6 | 5 | 4 | 3 | 2 | 1 |
| 21 | X | O | X | O | X | O |
| 22 | X | O | X | O | O | X |
| 23 | X | O | X | O | O | O |
| 24 | X | O | O | O | X | X |
| 25 | X | O | O | X | X | O |
| 26 | X | O | O | X | O | X |
| 27 | X | O | O | X | O | O |
| 28 | X | O | O | O | X | X |
| 29 | X | O | O | O | X | O |
| 30 | X | O | O | O | O | X |
| 31 | X | O | O | O | O | O |
| 32 | O | X | X | X | X | X |
| 33 | O | X | X | X | X | O |
| 34 | O | X | X | X | O | X |
| 35 | O | X | X | X | O | O |
| 36 | O | X | X | O | X | X |
| 37 | O | X | X | O | X | O |
| 38 | O | X | X | O | O | X |
| 39 | O | X | X | O | O | O |
| 40 | O | X | O | X | X | X |

FIG.3 (B)

| P | \multicolumn{6}{c}{PATH (SY)} |
| --- | --- | --- | --- | --- | --- | --- |
|  | 6 | 5 | 4 | 3 | 2 | 1 |
| 41 | O | X | O | X | X | O |
| 42 | O | X | O | X | O | X |
| 43 | O | X | O | X | O | O |
| 44 | O | X | O | O | X | X |
| 45 | O | X | O | O | X | O |
| 46 | O | X | O | O | O | X |
| 47 | O | X | O | O | O | O |
| 48 | O | O | X | X | X | X |
| 49 | O | O | X | X | X | O |
| 50 | O | O | X | X | O | X |
| 51 | O | O | X | X | O | O |
| 52 | O | O | X | O | X | X |
| 53 | O | O | X | O | X | O |
| 54 | O | O | X | O | O | X |
| 55 | O | O | X | O | O | O |
| 56 | O | O | O | X | X | X |
| 57 | O | O | O | X | X | O |
| 58 | O | O | O | X | O | X |
| 59 | O | O | O | X | O | O |
| 60 | O | O | O | O | X | X |
| 61 | O | O | O | O | X | O |
| 62 | O | O | O | O | O | X |
| 63 | O | O | O | O | O | O |

FIG.4

SINGLE-PATH MODE
N001   G01 X100 Y100 Z300 ;
.
.
.

MULTI-PATH MODE

MULTI-PATH SYNCHRONIZATION SYSTEM FOR CNC CONTROLLER

BACKGROUND OF THE INVENTION

1. Field of the Invention

The present invention relates to a multi-path synchronization system for a CNC controller in which a single control unit simultaneously controls a plurality of paths, and more specifically, to a multi-path synchronization system for a CNC controller which provides timing control for synchronization among the paths.

2. Description of the Related Art

A computerized numerical controller (CNC), in general, executes a machining process according to a sequence of NC programs (or part programs) which essentially describe only one tool-path at a time, and this type of NC control is thus called a single path control. In contrast to this, there is another type of NC control called multi-path control which concurrently runs a plurality of NC programs. The multi-path control is applied to a wide variety of industrial machines, whose axes under the control of the CNC controller are divided into several groups and the motion of each group of axes is defined by an individual NC program. Those groups of axes are referred to as the "paths."

For a smooth operation of the above-described multi-path control, the paths have to be properly synchronized to each other at some points of time. This multi-path synchronization must cover not only the axes directly controlled by the CNC but other mechanisms controlled by a programmable controller (PC) as well.

In conventional machines, some M-codes in NC programs have served as the commands to initiate the synchronization. If a certain path has produced such an M-code, the PC decodes it to determine a target path which the current path is going to synchronize with, and returns a finish signal (FIN) for the M-code after confirming that the target path has also issued an M-code to synchronize with the current path.

For another example of synchronization, there is such a situation that a certain path suspends its program execution until the near-end of another path's positioning operation (i.e., waiting until its remaining distance-to-go decreases below a predetermined threshold). In this case the PC should read out repetitively the remaining distance of the target path using window functions, which allow the PC to make access to some internal data in the CNC.

Further, in the case that one path keeps the other paths standing by for a predetermined period after a certain point of time, the PC should set a timer and return the FIN signal when the timer has expired.

As described above, such a conventional M-code-oriented synchronization system requires that many things be implemented as the PC tasks. That is, the development engineers have to define all the protocols for the synchronization and write complicated ladder programs to compare among the M-codes produced from a plurality of paths and interlock among the paths, using the window functions and counters. This results in an increased number of ladder steps and a lot of man-hours to develop the programs.

Another problem with the conventional system is that it cannot provide any sophisticated command because only one M-code is allowed in one block. Further, in the case that an axis starts in synchronization with another axis in a different path, the processing time could cause a limitation in the system performance since the system begins preparatory calculations for the axis motion after reception of a synchronization timing signal from the path.

SUMMARY OF THE INVENTION

A object of the present invention is to provide a multi-path synchronization system for a CNC controller, whereby the synchronization can be easily commanded and executed without depending too much upon a ladder program and its execution by a PC.

To accomplish the above object, according to the present invention, there is provided a multi-path synchronization system for a CNC controller in which a single control unit concurrently controls a plurality of paths. This synchronization system comprises the following:

A program storage unit stores NC programs corresponding to the respective paths. Those NC programs contain synchronization command codes with condition data for the multi-path synchronization. A decoding unit decodes the NC programs. An axis control unit controls axes in the paths by concurrently executing the NC programs decoded by the decoding unit. A synchronization control unit synchronizes the axes in the paths according to the condition data which accompanies the synchronization command codes.

The above system operates as follows. The program storage unit stores NC programs, each of which describes the motion of each path as well as containing some synchronization command codes with the condition data to specify various operational conditions of the multi-path synchronization. While the decoding unit decodes the NC programs for respective paths, the axis control unit controls the machine axes simultaneously executing the decoded NC programs. During execution of the NC programs, the synchronization control unit interlocks the motion of each axis according to the condition data given with the synchronization command codes written in the NC programs.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIGS. 3(A), 3(B), and 4 are diagrams illustrating combinations of synchronization target paths corresponding to various codes; and FIG. 5 shows an example of NC program using synchronization command codes.

DESCRIPTION OF THE PREFERRED EMBODIMENT

An embodiment of the present invention will be described below with reference to the drawings.

Figure 1:
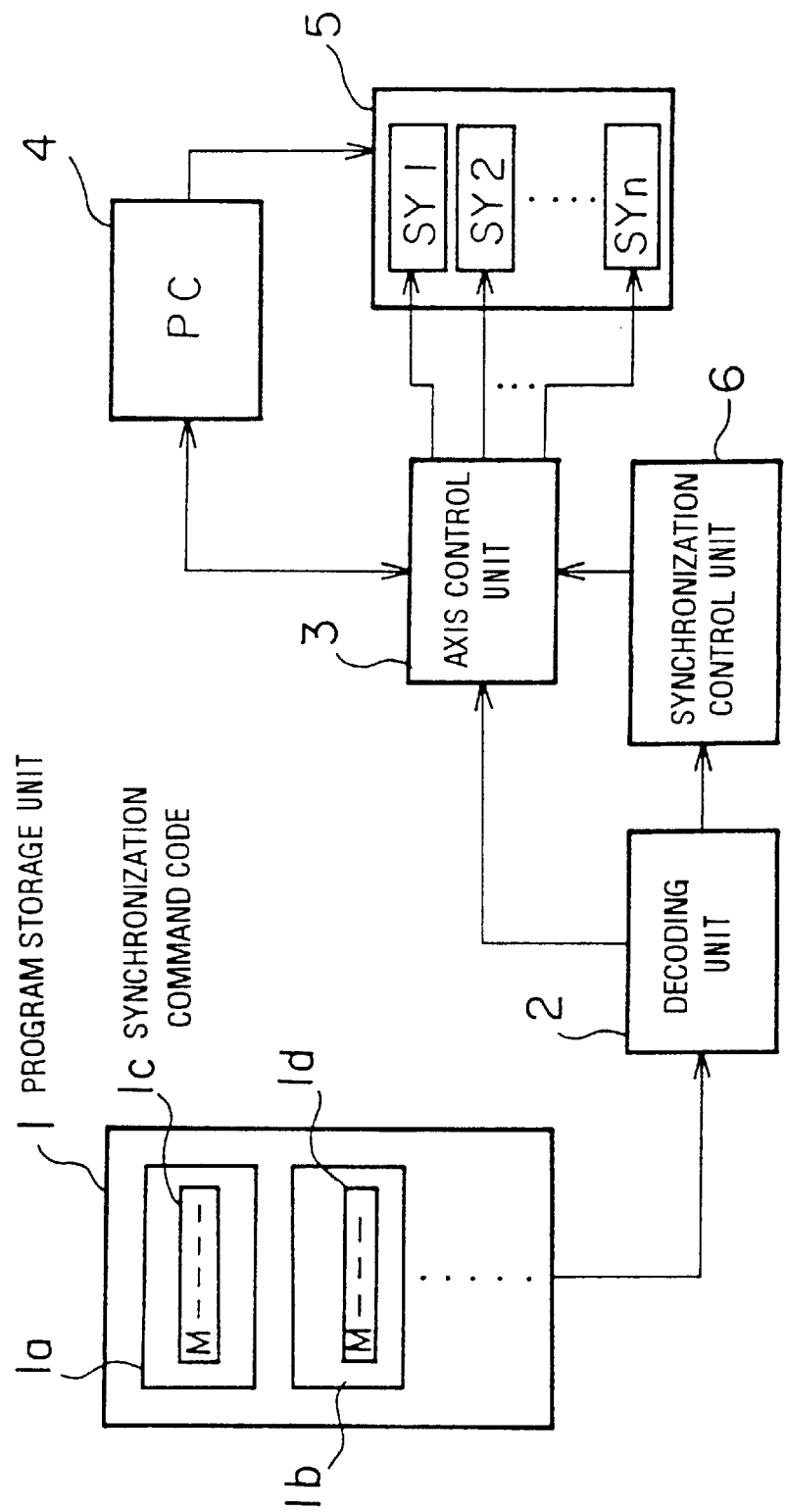
FIG. 1 is a conceptual view of an embodiment of the present invention.

FIG. 1 is a conceptual view of an embodiment of the present invention. Program storage unit 1 stores NC programs 1a, 1b which correspond to respective paths. Note that FIG. 1 omits some NC programs for further paths which may exist, in order to simplify the illustration. Those NC programs 1a and 1b contain some synchronization command codes 1c, 1d which include condition data to specify various operational conditions for the multi-path synchronization. Decoding unit 2 decodes the NC programs 1a and 1b for respective paths. Executing all the decoded NC programs in parallel, axis control unit 3 controls the axes of a machine 5 contained in the paths SY1 through SYn (n is the number of paths). Harmonized with those operations, a programmable controller (PC) 4 also controls some other mechanisms related to the above axes. During the execution of the NC programs, synchronization control unit 6 interlocks the motion of each axis according to the condition data specified by the synchronization command codes 1c, 1d written in the NC programs.

Figure 2:
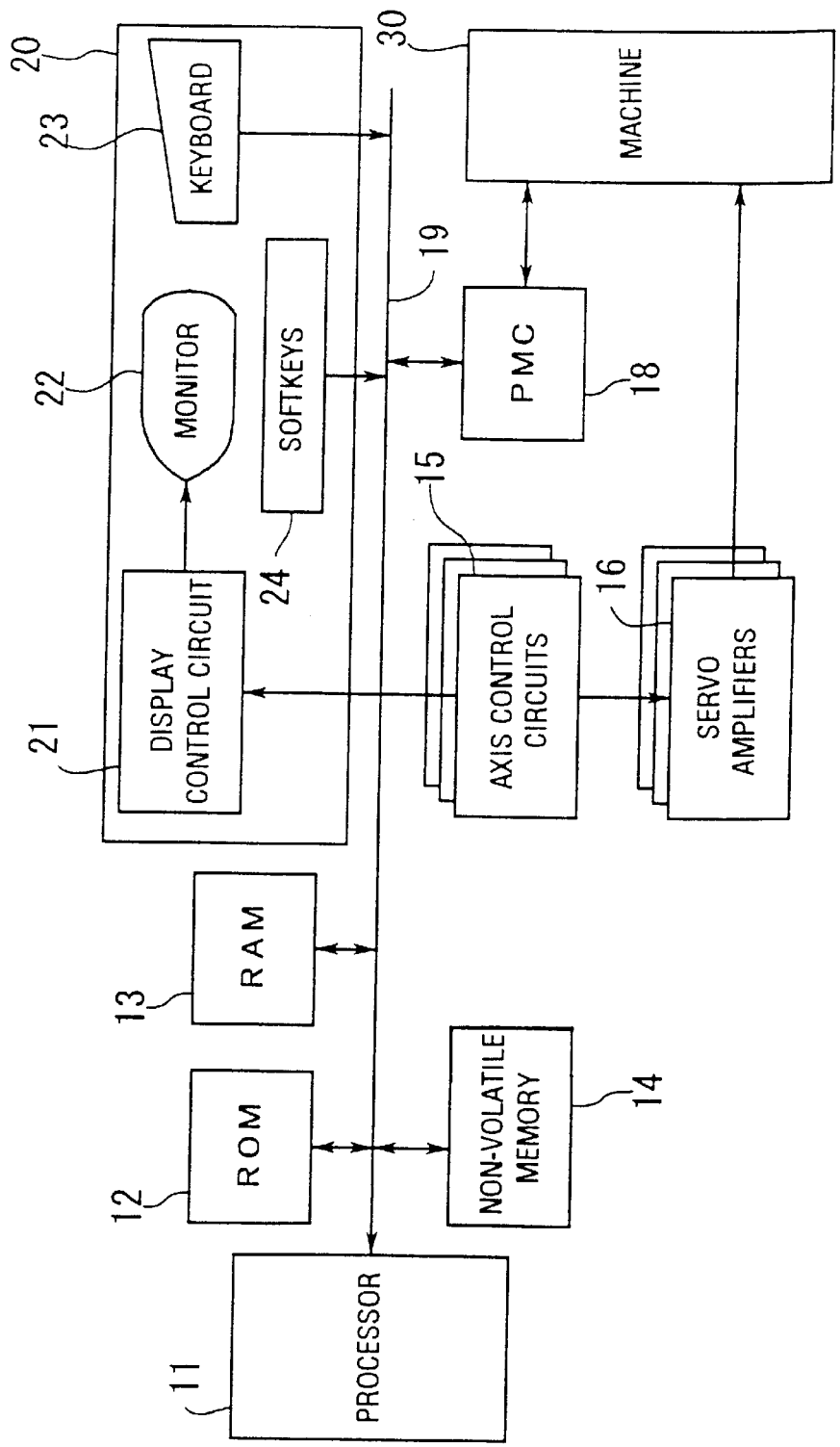
FIG. 2 is a block diagram showing a hardware configuration of a CNC controller according to the present invention.

FIG. 2 is a block diagram showing a hardware configuration of a CNC controller according to the present invention.

A processor 11 is a prime constituent of the CNC controller which supervises all over the controller according to system programs stored in a read-only memory (ROM) 12.

A random access memory (RAM) 13, which is organized by SRAMs and the like, stores temporary data in various calculations, display data, I/O signal data, etc. A nonvolatile memory 14 is actually organized by CMOS memory devices backed by some battery cells (not shown), and stores system parameters, NC programs, machine compensation data and so on, which must be retained even when the main power is removed.

A CRT/MDI (CRT display and Manual Data Input) unit 20 is mounted on the front panel of the CNC controller or arranged beside a machine operator's panel, which is used for displaying numerical data as well as graphics data, entering data and operating the CNC. A display control circuit 21 converts digital information such as numerical and character data into a raster video signal and applies it to a monitor 22 for displaying them. A CRT or liquid crystal display is suitable for the monitor 22.

A keyboard 23, constructed by alphanumeric keys, symbol keys and function keys, is used for entering and editing NC programs as well as operating the CNC controller. Softkeys 24 are located just below the screen of the monitor 22 and their actual functions depend on the definitions displayed on the screen. When the screen is switched to another function, the definitions of the softkeys 24 will immediately follow the new function.

Axis control circuits 15 produce velocity commands to servo amplifiers 16 in response to the axis motion commands from the processor 11. The servo amplifiers 16 amplify the velocity commands and drive servo motors (not shown), thereby controlling relative motion among the machine axes. Although its details are not shown in FIG. 2, the system incorporates the axis control circuits 15 and servo amplifiers 16 as many as the number of axes. A machine 30 represents an industrial machine such as a take-up machine, whose axes are under the multi-path control provided by the CNC controller, where the paths are synchronized by the synchronization commands in NC programs in the way to be described later on.

A programmable machine controller (PMC) 18 receives miscellaneous function signals (M-code), mechanical device selection signals (T-code) and the like from the processor 11 via a bus 19. The M-code includes some synchronization commands to be described later on. The PMC 18 deals with those signals based on its sequence control programs and produces some output signals to drive various control devices in the machine 30 such as pneumatic devices, hydraulic devices and electromagnetic actuators. In its sequence control process the PMC 18 also covers various input signals from the machine 30 such as limit switches, push buttons and switches on the operator's panel, and transfers some necessary input signals to the processor 11 via the bus 19.

The following description will provide a specific example of the multi-path synchronization system applied to the above-described CNC architecture.

Every NC program created for the multi-path CNC controller defines the motion of a specific path corresponding therewith. In case that a certain path requires synchronization with another path at a specific block, the block will be programmed with the following synchronization command:

$X\alpha M9xx\ Pp\ Qq\ Rr;$ where X represents an ordinary motion command code with an argument $\alpha$ to specify the amount of axis motion. The execution timing for this motion command code is designated by the code Qq to be described later in detail. The code M9xx is a synchronization command code, where two decimal digits xx distinguish the specific command codes from each other, thus being referred to as the synchronization type. The code Pp specifies a combination of the target paths to synchronize with, where its argument p indicates a combination pattern as shown in FIGS. 3(A), 3(B), and 4.

FIGS. 3(A), 3(B), and 4 illustrate various combinations of the target paths which corresponds to the above P codes, specifically in the case of a 6-path control. The symbol "○" shows that the path is a subject of synchronization, while the other symbol "×" shows that the path is not the subject. Taking a code P07 in FIG. 3(A), for example, it means that the paths SY1, SY2 and SY3 will be synchronized with each other but the remaining paths SY4 to SY6 will not. Another code P63 shown in FIG. 4 indicates that all the paths SY1 through SY6 will be synchronized.

The aforementioned code Qq is a code to designate synchronization conditions whose contents are specifically given by the argument q. When the argument q is zero or omitted, the path will start execution of its motion command code $X\alpha$ in the same block after synchronization of all the paths that have the same synchronization command code M9xx. In case that no motion command code $X\alpha$ is specified there, the path will simply proceed to the next block after the synchronization.

If the argument q is in the form of "10n" (n=1,2, ... ,9), the path immediately executes the motion command in the block and reports its ready status to the other paths when the remaining distance-to-go of its n-th axis becomes less than the value specified by a code R. The ready status indicates that the path has met the required synchronization conditions and it is now ready to synchronize with other specified paths.

In case that the argument q is 200, the path immediately executes the motion command in the block and reports its ready status to the other paths when the time specified by the code R has elapsed since the beginning of the block.

As already mentioned, the code Rr is a code to specify the timing of the synchronization. Depending upon the code Qq, its argument r indicates a remaining distance-to-go in units of $\mu$m or mm (when q is 10n), or the time elapsed since the beginning of the block (when q is 200).

FIG. 5 shows an example of NC program using such a synchronization command code. Actual NC programs for multiple paths can be provided in a plurality of sections in a single program file, being segmented by some specific G codes as FIG. 5 exemplifies.

This NC program involves three paths SY1, SY2 and SY3 and these paths respectively consist of two axes, one axis and three axes. The program starts in a single-path control mode from the block number N001, and in completion of this single-path mode, it enters the multi-path control mode, where a plurality of NC program blocks from N100, N200 and N300 will run in parallel, being initiated by the code G130 written in those blocks.

Codes P1, P2 and P3 following the code G130 indicate the path numbers. That is, P1 indicates the first path SY1, P2 indicates the second path SY2, and similarly, P3 indicates the third path SY3. In addition to those P codes, the codes "X1 Y1" after P1, "Z1" after P2, and "U1 V1 W1" after P3 respectively show the names of axes under the control of the respective paths.

Block N120 of the program for the first path SY1 commands the following:

$$M901\ P07\ Q101\ R10;$$

In this block, the code M901 initiates a multi-path synchronization, and the code P07 specifies all the paths SY1, SY2 and SY3 to be subject to the synchronization (see FIG. 3(A) for the code pattern definition). The next code Q101 means that the path will signal the ready status to the other paths when the remaining distance-to-go of the first axis (i.e., X-axis) becomes less than 10 $\mu$m (or 10 mm) as specified by the code R10.

In the NC program for the second path SY2, block N220 commands the following:

$$M901\ P07;$$

Those two codes, M901 and P07, imply that the second path SY2 is also commanded the same synchronization as that in block N120 of the first path SY1. Note that there is no Q code specified in this block, which absence means that the path SY2 should simply wait for the synchronization ready status to be signaled from the first path SY1 before advancing toward the next block N230.

The third path SY3 has the same command "M901 P07" as that of the second path SY2. Thus, the path SY3 should also wait for the signal from the path SY1 before advancing toward the next block N330.

As described above, in this preferred embodiment of the present invention, the synchronization command code is accompanied with various data for conditioning the multi-path synchronization such as a synchronization type (e.g., M901), a combination of target paths (e.g., P07) and synchronization timing conditions (e.g., Q101 R10). The CNC can handle all those things by itself so that it will easily perform the multi-path synchronization control. It is no longer necessary to write additional ladder programs or burden the PMC with more load.

The above discussion will be summarized as follows. According to the present invention, the synchronization command codes accompanied with synchronization condition data are written in the NC programs of respective paths. While those NC programs are concurrently executed so as to control the respective axes, the multi-path synchronization is performed according to the synchronization condition data specified by the synchronization command codes. This structural arrangement allows the CNC to control the synchronization process alone. As a result, the multi-path synchronization is programmed and executed without help of the PC, thereby eliminating conventional work to create additional ladder programs and also preventing the PC from incurring additional burden.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A multi-path synchronization system for a computerized numerical controller (CNC) in which a single control unit simultaneously controls a plurality of paths, comprising:

program storage means for storing NC programs corresponding to the respective paths, wherein the NC programs each describe a motion of a respective one of the plurality of paths and each contain synchronization command codes with condition data for the multi-path synchronization;

decoding means for decoding the NC programs;

axis control means for controlling axes in the paths by simultaneously executing the NC programs decoded by said decoding means; and synchronization control means for synchronizing the axes in the paths according to the condition data accompanying the synchronization command codes, wherein timing of the synchronizing is based upon one of a remaining distance to go and time elapsed.

2. A multi-path synchronization system for a CNC controller according to claim 1, wherein the condition data comprises a synchronization type, a combination of target paths, and synchronization timing conditions.

* * * * *